United States Patent [19]

Chaum

[11] Patent Number: 4,947,430

[45] Date of Patent: Aug. 7, 1990

[54] UNDENIABLE SIGNATURE SYSTEMS

[76] Inventor: David Chaum, 14652 Sutton St., Sherman Oaks, Calif. 91403

[21] Appl. No.: 123,703

[22] Filed: Nov. 23, 1987

[51] Int. Cl.$^5$ .............................................. H04L 9/02
[52] U.S. Cl. ........................................ 380/25; 380/30; 380/23
[58] Field of Search .............................. 380/30, 23, 25

[56] References Cited

U.S. PATENT DOCUMENTS

| 4,590,470 | 5/1986 | Koenig | 380/30 |
| 4,612,413 | 9/1986 | Robert et al. | 380/30 |
| 4,748,668 | 5/1988 | Shamir | 380/30 |
| 4,759,063 | 7/1988 | Chaum | 380/30 |
| 4,759,064 | 7/1988 | Chaum | 380/30 |

Primary Examiner—Thomas H. Tarcza
Assistant Examiner—David Cain
Attorney, Agent, or Firm—Nixon & Vanderhye

[57] ABSTRACT

Cryptographic methods and apparatus for forming, checking, blinding, and unblinding of undeniable signatures are disclosed. The validity of such signatures is based on public keys and they are formed by a signing party with access to a corresponding private key, much as with public key digital signatures. A difference is that whereas public key digital signatures can be checked by anyone using the corresponding public key, the validity of undeniable signatures is in general checked by a protocol conducted between a checking party and the signing party. During such a protocol, the signing party may improperly try to deny the validity of a valid signature, but the checking party will be able to detect this with substantially high probability. In case the signing party is not improperly performing the protocol, the checking party is further able to determine with high probability whether or not the signature validly corresponds to the intended message and public key. Blinding can be used while obtaining undeniable signatures, while providing them to other parties, and while checking their validity.

48 Claims, 6 Drawing Sheets

UNDENIABLE SIGNATURE SYSTEMS

BACKGROUND OF THE INVENTION

1. Field of the Invention

This invention relates to cryptographic systems, and more specifically to multiparty authentication systems like public key digital signatures.

2. Description of Prior Art

The concept of a "public key" is well known in the art. To form such a key, a secret seed is first chosen, typically at random from some suitable distribution. This secret seed is then used as the input to a public key creating algorithm. The resulting public key need not be kept secret; because of the "one-way" nature of the creating algorithm, deriving the secret seed from the public key is thought to be infeasible.

An often necessary aspect of public keys is their authenticity. There may be many users of a particular public key, and each must be ensured that they have its true value. If a bogus value were to be accepted as authentic by a particular user, then that user's security might be violated by the bogus key's creator. An example solution to this problem, which is often suggested, is to publish and widely distribute a directory of public keys.

An important use of public keys is for public key digital signatures, which are called "digital signatures" here for clarity. The message to be signed by a digital signature is represented as a number. The digital signature itself is also a number. It is formed from the message by a signing algorithm which uses a private key derived from the secret seed. A digital signature can be checked as corresponding to a particular message and public key combination, by applying a checking algorithm. Because the corresponding private key is thought to be needed in forming digital signatures, they are thought to be resistant to forgery.

One inherent property of digital signatures is that they can be checked by anyone knowing the corresponding public key. Thus, if you were to give a digital signature to someone, then they could show it to anyone else. Not only would each person seeing the signature be able to check it, but they could in turn supply it to others, who could also check and distribute it. Whereas this might be an advantage in some applications, it could be undesirable in others. For example, the issuer may wish to retain some monitorability or control over the showing of signatures.

The first really practical digital signature system was disclosed by Rivest, Shamir and Adleman in "A method for obtaining digital signatures and public-Key cryptosystems, "Communications of the ACM, Vol. 21, No. 2, February 1978. This so called RSA system remains probably the best known and most widely used for digital signatures. One of its drawbacks, however, is that its public key creating algorithm requires quite a substantial amount of computation compared to that required to form its digital signatures. Like most successful public key systems devised to date, RSA is partly based on the "discrete log" problem: all of its arithmetic is done in a finite group where given the representation of an element and a large power of that element, it is thought to be infeasible to discover what the power is. In essence, RSA and its cousins require that the order of the group be known only to the signer, which imposes a significant restriction on the group, making suitable groups difficult to find and also requiring a single group per signer.

RSA does, however, allow blind signatures, as described in European Patent Publication 0139313, dated 2/5/85, claiming priority on U.S. Ser. No. 524896, titled "Blind signature systems," by the present applicant. These first disclosed blind signatures required computation during blinding to anticipate all possible signature types. This amounted to more than a single multiply per signature type anticipated. The so called "unanticipated blind signatures" require only a fixed amount of computation during blinding to anticipate an unlimited number of kinds of signatures that might potentially be applied by a signer. Such systems were described in European Patent Publication 0218305, dated 4/15/87, claiming priority on U.S. Ser. No. 784999, titled "Unanticipated blind signature systems," also by the present applicant. A remaining difficulty with the exemplary embodiments of both schemes, however, is that the signer must be fixed at the time of blinding and cannot be changed, even for so called "re-blinding".

The other widely accepted digital signature scheme was disclosed by ElGamal in "A public key cryptosystem and a signature scheme based on discrete logarithms," Advances in Cryptology: Proceedings of CRYPTO 84, G. R. Blakely and D. Chaum Eds., Springer-Verlag, 1985. Whereas it is also discrete-log based, it does not require that the order of the group be kept secret, but does require that the order be known to all signers using the same group. Its public key creation algorithm is essentially as fast as its signing algorithm, but blind signatures have not been constructed based on these ElGamal signatures.

OBJECTS OF THE INVENTION

Accordingly, it is an object of the present invention to provide a signature scheme that can require consent of the signer each time a signature is checked.

Another object of the present invention is to allow public key creation algorithms having a computational requirement comparable to that of signing.

A further object of the present invention is to allow a kind of blind signature in which blinding does not have to anticipate the type of signature nor who the signer will be.

Yet another object of the present invention is to allow signature schemes based on discrete log in groups for which nobody need know the order of the group, and for which there may be no harm if anyone learns it.

Still another object of the present invention is to allow efficient, economical, and practical apparatus and methods fulfilling the other objects of the invention.

Other objects, features, and advantages of the present invention will be appreciated when the present description and appended claims are read in conjunction with the drawing figures.

BRIEF SUMMARY OF THE INVENTION

In accordance with these and other objects of the present invention, a brief summary of an exemplary embodiment will now be presented. Some simplifications and omissions may be made in this brief summary, which is intended only to highlight and introduce some aspects of the invention, but not to limit its scope. Detailed descriptions of preferred exemplary embodiments adequate to allow those of ordinary skill in the art to make and use the inventive concepts are provided later.

An undeniable signature is verified by a cryptographic protocol conducted between the checker and the signer. In overview, the protocol of the exemplary embodiments consist of a challenge number formed by the checker and given to the signer, followed by a response number returned by the signer. After the exchange of this challenge and response, the checker performs a checking procedure. The inputs to the procedure are the response from the signer as well as the suitably-chosen random values used by the checker in forming the challenge. If the procedure's result is positive, then the checker has high certainty that the signature is valid, and consequently the verification of the signature can be regarded as completed.

If, on the other hand, the procedure's result is negative, the checker may wish to distinguish between two cases: (a) the signature is not valid; or (b) the signer is responding improperly to challenges, presumably in an effort to falsely deny a valid signature. The checker can learn which of the two cases applies—in spite of the signer's efforts to mislead the checker—by a further round of challenge and response. The second challenge and response can be formed in the same way as the first ones were, but both sets of independent random choices and both responses allow the checker's second procedure to determine which case above, (a) or (b), holds. The pair of challenges and corresponding responses may be thought of as in effect allowing the checker to learn whether the signer is answering consistently or not.

A simple example of these protocols and the checking procedures will now be described based on the multiplicative group having prime order p, with primitive element g, both of which could be used by every signer. (The fact that the order of the group is prime and public is used in this simple embodiment, but are not necessary in general). Consider a particular signer S, checker V, message m, private key x, public key $g^x$, and signature z that should equal $m^x$. The first challenge is of the form $z^a g^{xb}$, where a and b are chosen by the signer independently and uniformly from the interval 1 to p. The signer's response should be the result of raising the challenge to the power y, where y is the multiplicative inverse of x modulo p. Thus the signer responds with $m^a g^b$, which V can readily construct for comparison. If the comparands are equal, then V is believed to know that with probability $1 - p^{-1}$ the signature is valid.

If the comparands are unequal, however, V may still wish to know if the signature z is invalid or if S is trying to improperly deny it; so the protocol is repeated with independently chosen c and d instead of a and b, respectively. Then V uses the two responses $r_1$ and $r_2$ to test whether $(r_1 g^{-b})^c = (r_2 g^{-d})^a$. If the equality holds, it is believed that S is answering consistently and that z is not a valid signature, with the same high probability as for signature validity; otherwise, S is answering improperly.

GENERAL DESCRIPTION

Figure 6:
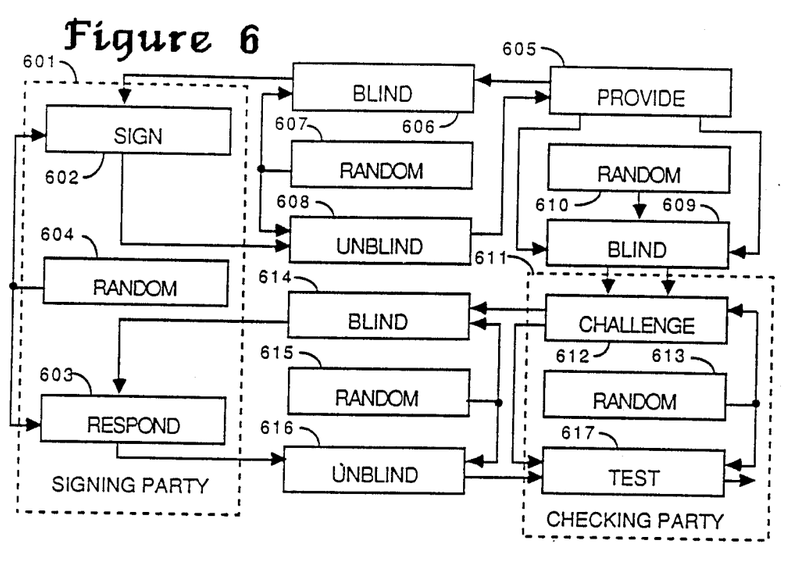
FIG. 6 shows a combination block and functional diagram of an exemplary unanticipated signature system including blinding for signatures and challenges and also re-blinding, all in accordance with the teachings of the present invention.

Turning now to FIG. 6, general descriptions of the interconnection and cooperation of the constituent parts of some exemplary embodiments of the present invention will first be presented.

The signing party 601 includes two transformations, signer 602 and responder 603, both of which depend on the secret seed value created by random generator 604. The initial output of a public key message (message [10] in FIG. 1, to be described) is not shown here for clarity and also because in some embodiments, like the preferred embodiments to be presented, a distinguished public key is not needed, since any undeniable signature (together with its corresponding unsigned message) can serve as such a public key, as will be obvious those of ordinary skill in the art.

When the provider 605 provides an original message for signing, it may first optionally be blinded by blinder 606, which depends on random generator 607, before being input to signer 602, already mentioned. The signed output of signer 602 is then input to optional unblinder 608, which also depends on random generator 607, and which is used only when optional blinder 606 has been used. The output of unblinder 608 is then returned to provider 605.

Optionally, both the signed and unsigned message are individually blinded by blinder 609, depending on random source 610, before they are provided as input to a part of checking party 611 which is shown as challenger 612. Challenger 612 is dependent on random generator 613, also shown as part of checking part 611, and provides its challenge message(s) optionally to blinder 614, which depends on random source 615. The output of the optional blinder 614 is input to responder 603, which depends on random source 604 as already mentioned, and responder 603 provides its output to unblinder 616, which is used only when blinder 614 has been used and also depends on the random source 615. Then unblinder 616 provides its output to tester 617, a final part of checking party 611, responsive to random source 613 already mentioned and to challenger 612, and which produces the final three valued output (indicating whether the undeniable signature is valid, the signature is invalid, or the response is improper).

Figure 2:
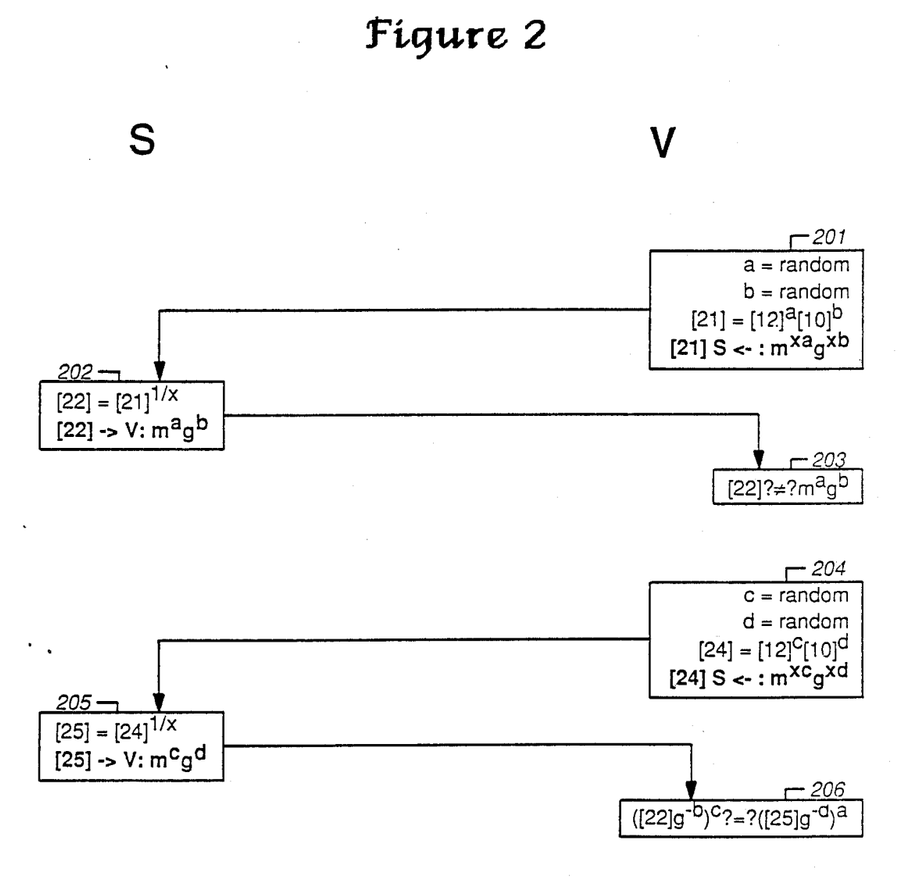
FIG. 2 shows a flowchart of a preferred embodiment of a first exemplary undeniable signature checking protocol in accordance with the teachings of the present invention.
Figure 3:
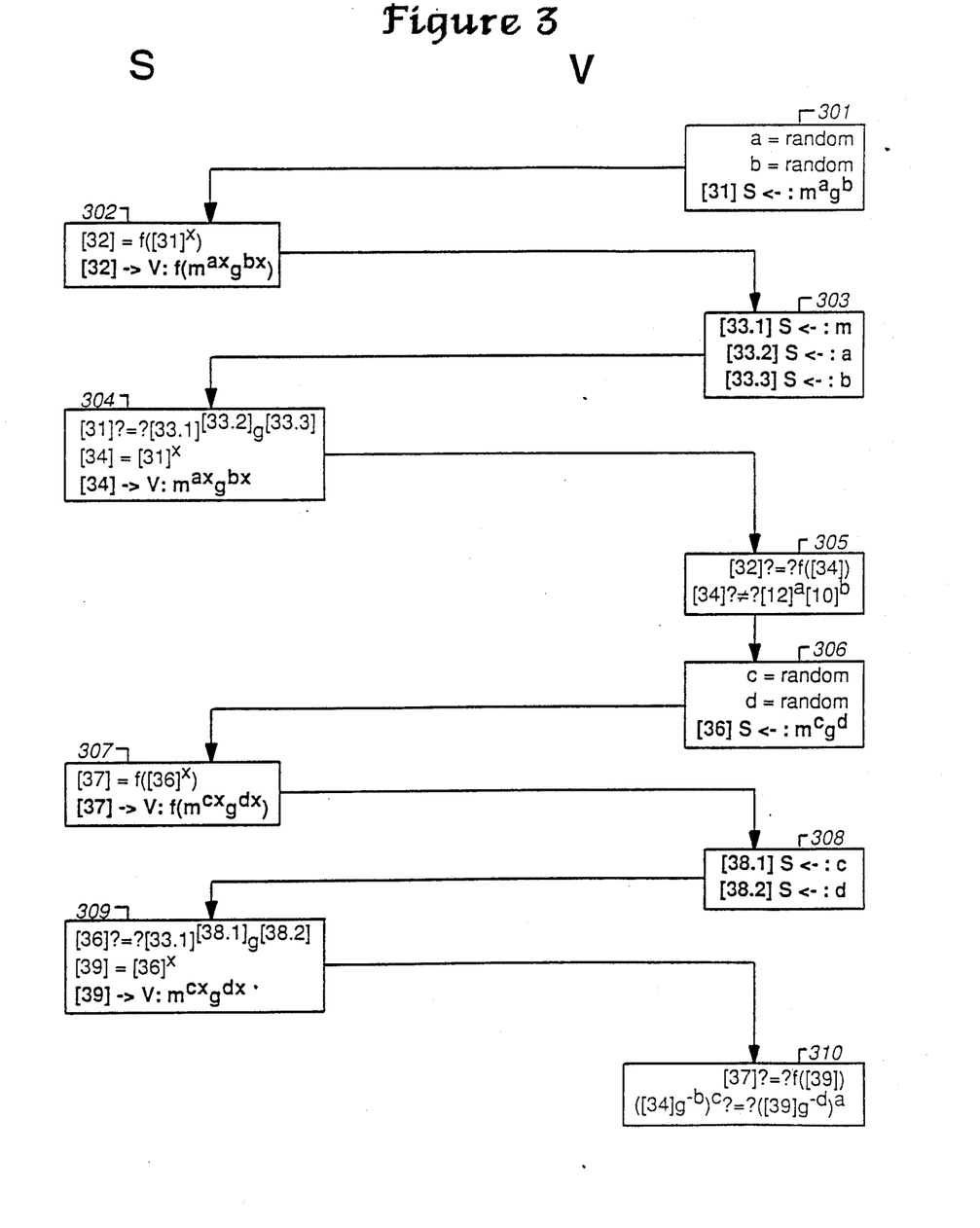
FIG. 3 shows a flowchart of a preferred embodiment of a second alternate exemplary undeniable signature checking protocol in accordance with the teachings of the present invention.

The relation of the parts of FIG. 6, just described, to those of FIG. 1 through FIG. 5, which are to be described in detail later, will now be briefly described for completeness. Signer 602 of signing party 601 is shown as box 103, and also as box 402 or 502 when optional blinding 606 is used. When blinding 402 or 502 are used, then unblinding 607 is shown in box 403 and 503, respectively. The optional blinding of signed and unsigned messages before they are used in the protocols of FIG. 2 or FIG. 3 is shown as performed by binder 609. This binder produces a blinded and unblinded message pair, as already mentioned, which is shown in box 404 and 504, depending on wether the blinding of FIG. 4 or that of FIG. 5 is used, respectively. The challenger 612 and tester 617, both depending on random source 613 as mentioned, are both either of the type shown in FIG. 2 or that shown in FIG. 3. In the case of FIG. 2, challenger 612 is shown in both boxes 201 and 204; in the case of FIG. 3, it is in boxes 301 (supported by 303) and 306 (supported by box 308). Then one or more related challenges may optionally be blinded by blinder 614, which as mentioned is responsive to random source 615, such blinding being as shown in box 401 or box 501. Then responder 603 transforms each challenge, responsive to the output of random source 604 already mentioned, using the same choice of FIG. 2 or FIG. 3 used by the challenger 612 and tester 617 as already mentioned. For FIG. 2, the responses are shown formed in box 202 and 205; for FIG. 3 they are formed in boxes 302 combined with 304 and in 307 combined with 309. These responses are unblinded by optional unblinder 616, only when optional blinder 614 has been used as mentioned. Finally, the tester 617, responsive to random source 613 as mentioned, checks the responses using the same choice of FIG. 2 or FIG. 3 as described previously for challenger 612 and responder 603. For FIG. 2, the checking is shown spanning boxes 203 and 206; for FIG. 3, it is shown in boxes 305 and 310. The results of these tests determine the output of the tester 617.

As will be appreciated, the blinding of blinder 606 and its corresponding unblinding by blinder 608 will be used or not used as a whole; similarly for that of 614 and 616; and the blinding of the signed and unsigned message pairs by blinder 609 may be omitted or kept in its entirety. When such optional blinding and possibly unblinding is omitted, the blinding and unblinding operations shown are transparent and just pass their inputs through without change to their outputs, as might also happen if certain values are produced by the random sources involved.

General descriptions of the functions of some constituent parts in accordance with the teachings of the present invention will now be presented.

First it should be mentioned that all the lines in FIGS. 1–6 imply the transfer of messages. These may be held initially or delayed on their way, encoded and decoded cryptographically or otherwise to provide their authenticity and/or secrecy and/or error detection and/or error recovery. Thus the particular means or methods whereby messages are transferred are not essential to the present invention, and it is anticipated that any technique may be employed in this regard. The lines may for example be taken to represent communication means, in which case they might be realized in a variety of exemplary ways including as conductive paths, fibre optic links, or paths through a packet switched network; also suitable drivers, modems, or other appropriate interfaces may be required at the ends of such lines, as are well known in the art. Alternatively, the lines may be taken to stand for a message transfer step.

In FIG. 6, signing party 601 and checking part 611 are each shown as a collection of parts including two transformations and a random source. As will be described in detail later, FIGS. 1–5 also show parties as a collection of flowchart boxes forming a vertical column. The term "party" is used herein to indicate an entity with control over at least the secrecy of some information, usually at least one key. It is anticipated that a plurality of people may each know all or part of some key, and they might be thought of collectively as a party. In other cases, a key may be substantially unknown to people, and reside in some physical device, and the the device itself or those who control it from time to time may be regarded as parties. Thus the parties denoted by single boxes or collections of boxes might sometimes be regarded as agents who perform a step or a collection of steps in a protocol. They might also be regarded as means for performing those steps and might be comprised of any suitable configuration of digital logic circuitry. For example, any box or collection of boxes from the figures could be realized by hard-wired and dedicated combinatorial logic, or by some sort of suitably programmed machine, a microprocessor for instance, such as are well known to those of skill in the art, just so long as it is able to perform the storage, input/output and transformational steps (possibly apart from the random source functions) described by the corresponding box or boxes.

Random sources 604, 607, 610, 613, and 615 of FIG. 6 and the uses of the word "random" shown in FIGS. 1–5 indicate the function of creating a value that should not be readily determined by at least one party. Many means and methods are known in the art for generating such unpredictable quantities, often called keys. Some are based on physical phenomena, such as noise in semiconductors, or patterns detected in humans pushing buttons, or possibly deterministic cryptographic techniques sometimes called pseudorandom generators. It is well known in the art that these various techniques can often be combined, and that post-processing can often improve the results.

Again referring to FIG. 6, the function of some constituent parts is continued.

Signer 602, one transformation of signing party 601 already mentioned, is any transformation that is believed at least not readily performed without the private key output of random source 604 and which cooperates with the challenge, response, and testing to be described. Naturally, as a kind of signature, the signer's output should be resistant to forgery by those without the signer's private key.

Provider 605 is a source of original messages to be signed. Its particular nature is not essential to the invention, and any way to obtain messages for which undeniable signatures will be made is suitable. Examples of messages requiring signatures known in the art include agreements, numbers with redundancy properties that encode value, blinded forms of digital pseudonyms, any sort of messages transferred between parties, etc.

Blinder 606 cooperates with unblinder 608 and derives its blinding key from random source 607. The blinding and unblinding function performed is to hide some message issued by the provider 605 by at least making it substantially unrecognizable to signer 602, and then to recover from the signature returned by signer 602 what would have been the signature had the signer signed the original message. Furthermore, blinding, as is well known in the art and disclosed more fully in the references cited in the background of the invention, makes it substantially infeasible for the set of blinded messages to be linked to the set of unblinded messages. Of course it is the signer's lack of knowledge about the particular outputs of the random source which is believed to make it substantially impossible, in the preferred embodiments, for the signer to link. This blinder 606, as well as the two other blinders 609 and 614 may use for example the embodiments of FIG. 4 or those of FIG. 5, and this may be mixed for the same or for different original messages.

Blinder 609 blinds, as described above, a pair of values corresponding to a signed and unsigned form of a message. In this way, the pair can be tested, as will be described, without even the party performing the test knowing what the actual message bearing the signature is. Thus no corresponding unblinding is needed, as the unblinded form may be retained by the provider 605. By issuing more than one pair of differently blinded forms of the same input pair, so called "re-blinding" as described in the unanticipated blind signature reference may be realized.

Checking party 611 already mentioned, comprising a key source as well as challenge creation and response testing parts may, but need not, be a distinct party from provider 605 already described. (The checking party 611 is shown in FIGS. 2 and 3 as party V, which is the same symbolic name used for the provider and blinding parties in FIGS. 1, 4, and 5, but such naming is only for clarity and does not imply that these parties are necessarily the same.) A signature may sometimes be verified immediately by the provider who has requested it, or it may be verified later by some third party who received it directly or indirectly and possibly in blinded form from the provider. The checking party performs a cryptographic protocol in effect with signing party 601, although there may be intermediate blinding and unblinding of messages by blinder 614 and unblinder 616 to be described, which might possibly be controlled by yet another party. While the exemplary embodiments show some particular preferred patterns of interaction between the checking party 611 and the responder 603, any suitable protocol accomplishing the function of distinguishing the three cases described earlier would be appropriate. Furthermore, the preferred embodiments break the challenge and response sequence down into several parts, all or any of which could be combined (so long as for FIG. 3 the issue of the image under the one-way function, messages [32] and [37], precedes the receipt of the values needed by the signing parties checking, messages [33] and [38], and this precedes the release of the pre-image under the one-way function by the signing party, messages [34] and [39]). The challenge is issued responsive, in the exemplary embodiments, to either the signed or unsigned form of the message and to the key from random source 613.

Blinder 614 optionally blinds the challenge(s), responsive to random source 615, before it is received by the signing party.

Responder 603 receives the possibly blinded challenge(s) and issues corresponding response(s). Any sort of response or sequence of responses cooperating with and allowing the checking party to distinguish the three cases would be sufficient. In the preferred embodiments, these responses include exponentiation to powers derived from private key source 604, as shown in detail in FIGS. 2 and 3.

Unblinder 616, also responsive to key source 615, unblinds the response. It cooperates with blinder 614 in keeping at least one of the signing party or the checking party from learning the actual messages issued and received by the other party.

Tester 617, responsive to random source 613 and challenger 612, tests the responses to the challenges in a way that allows it to distinguish between three cases: (a) the signed message validly corresponds to the unsigned message, (b) the signed message does not validly correspond to the signed message, and (c) the signer is responding to the challenges improperly. These possibilities are distinguished in FIG. 2 by the tests of boxes 203 and 206, and in FIG. 3 by those of boxes 305 and 310. Thus the output of the test may simply be an indication of which of the three cases is thought likely to hold. It should be pointed out that the first box for each figure mentioned alone actually distinguishes between case (a) and the other two cases taken together. Thus it might be suitably employed by the provider just after a signature is received, to determine whether it is in fact valid. The second box mentioned distinguishes between the remaining two cases. It need not be used if the first test is positive or when it is otherwise not needed to distinguish between cases (b) and (c). In fact, many applications may not distinguish between cases (b) and (c) for the vast majority of signatures, but it is anticipated that the possibility that they could be distinguished is what makes the application viable.

While not shown explicitly in FIG. 6 for clarity, it should be pointed out that the signing party 601 may issue public key digital signatures authenticating its responses to inputs. Such digital signatures are well known in the art, and would include both the input and the corresponding output, possibly all under a compressing one-way function or the like. When such a digital signature is shown to a third party, possibly along with the various random choices and messages used to construct the input, the third party is able to authenticate the digital signature and test the input and output as would have been done by tester 617, as would be obvious to those of skill in the art and will be described in detail for some examples later. Thus, such digital signatures might be obtained from the signing party and later provided to a third party so that the third party need not interact with the signing party. This might save a third party, who trusts the signing party, from having to communicate with the signing party in order to check an undeniable signature.

The particular choice of the group under which the exemplary embodiments may operate is not essential to the invention, however, for completeness various exemplary groups believed suitable will now be discussed along with their representations and some relevant considerations.

One general category of preferred exemplary embodiment would use a group of prime order. Such a group should preferably have a representation for which the already mentioned discrete log problem is believed difficult to solve in practice and for which the group operation and exponentiation are readily performed. Several exemplary such groups are now described.

One class of suitable groups, the multiplicative groups over $GF(2^n)$ where $2^n-1$ is prime, is quite well known in the art. A survey of the literature on cryptographic use of these and other suitable groups, entitled "Discrete logarithms in finite fields and their cryptographic significance," was published by A. Odlyzko in the proceedings of Eurocrypt 84, T. Beth, N. Cot, and I. Ingemarsson Eds., Springer 1985.

A second and third exemplary class of suitable groups are defined based on the residue classes modulo a suitable large prime. It appears to be currently believed in the art that primes of sizes $2^{512}$ to $2^{1000}$ for example may provide security quite adequate for many applications in practice, though the present invention should in general not be interpreted as limited to groups of any particular size, since it can be applied using groups of any size allowing the requisite computations to be performed. Apparatus and methods for performing the group operation and exponentiation for such groups are by now well known in the art and available from several vendors.

For completeness, a few facts well known in the art will now be reviewed that might be employed to advantage in realizing the present invention efficiently in such groups. Primality tests of various types are quite well known in the art, which are capable of yielding primes of the required size. It is believd that, while proofs that there are infinitely many primes q such that $q-1$ is twice a prime are not known, experimental results show that such primes seem to occur with substantially the density that might be expected for the sizes mentioned above. Thus a prime with this property may be created simply by trying random numbers of the desired size, discarding those that fail to pass a primality test, and then further requiring that half one less than a successful candidate also passes a primality test.

A second preferred exemplary embodiment is based on the multiplicative group of residue classes modulo q, with $q-1=2p$ and p a prime, whose least positive representatives are less than or equal to p. The group operation is ordinary multiplication modulo p, except that the result is normalized by taking either the product itself or its additive inverse, whichever has the smaller least positive representative. Thus, all integers between 1 and p inclusive may be regarded as representing the members of the group, such membership being easy to check and such members being easy to map to from some original message space.

A third preferred exemplary embodiment uses the group of squares modulo a prime q also such that $(q-1)/2=p$ is prime. It is well known in the art that only elements in the group of squares modulo a prime have Jacobi symbol 1 modulo that prime. Efficient algorithms for determining the Jacobi symbol of such values are also well known in the art. Since half the residues modulo such a prime are squares modulo that prime, i.e. have Jacobi symbol 1, it is a simple matter to find elements in the group of squares and to test elements for membership in that group. Another exemplary way to create an element that is known to be a square modulo q is simply to form the element as the square of any element modulo q. It is also well known that an element can be shown to be a square simply by showing its square root. Since every element apart from 1 in the group of squares, or any group of prime order, generates the group of squares, the generator g can readily be taken to be the square of some public number, which allows everyone to verify that g is in the group of squares just by checking that it results from squaring its public square root and that it is not 1.

The prime q and the generator g for this third exemplary embodiment can be readily created as described above in a way which allows anyone receiving them to verify that they have the proper form. Some applications may require an efficient way to map from say small integers to elements m suitable for signing. One way to accomplish this, suggested by M. O. Rabin in "Digitalized signatures and public-key functions as intractable as factorization," which appeared as MIT technical report MIT/LCS/TR-212, January 1979, is to in effect multiply the input number by a small power of 2 and randomly change the low-order bits zeroed and test for membership in the group. If the test fails, simply replace the low order bits with randomly chosen bits and repeat until success. Other applications may only require that elements in the group can be created; for these, the squaring of random values mentioned above would be sufficient. Finally, participants should test that the numbers they receive are in the group, which is also readily accomplished as already described.

Another exemplary embodiment uses a group with a known subgroup of small order (possibly with unknown subgroups of larger, and preferably only much larger, order). For example, consider the group of residues modulo a prime q such that $q-1$ is twice a prime, as already described. Instead of working with the group of squares or an isomorphic subgroup as already described, the entire group of residues could be used. The inequalities tested by V in the protocols of FIG. 2 and FIG. 3 (i.e. the last lines of boxes 203 and 305), are considered satisfied exactly when either they are satisfied as written or when they would be satisfied were one comparand to (i.e. thing to be compared) be multiplied by $-1$. The certainty given by the tests of FIG. 2 or FIG. 3 is believed to be essentially the same as that achieved with the group of squares of the same modulus. (For the binding shown in FIG. 4 under this arrangement, each output is multiplied by $-1$ or left unchanged by V, the choice depending on an unbiased independent coin flip secret to V.)

Yet another preferred exemplary embodiment works with a group which has arbitrary structure. Unlike the groups of public and prime order already described, these groups may have an arbitrary group structure, and may even include many subgroups of small order. The group structure need not be known to any participant, and all or part of it might even secretly or openly be known to some participants. Multiparty security is still achievable in such a setting. But since there may be subgroups of order 2, the protocols of FIG. 3 in particular might have to be repeated j times to yield certainty of $1-j^{-2}$, since it is believed that each iteration would yield at least certainty of one-half. Naturally the 2 in the previous remark could be replaced by any known lower bound on the order of nontrivial subgroups.

DETAILED DESCRIPTION OF THE PREFERRED EMBODIMENTS

While it is believed that the notation of FIGS. 1-5 would be clear to those of ordinary skill in the art, it is here reviewed for definiteness.

The operations performed are collected together into flowchart boxes. The column that such a box is in indicates which party performs the operation defined in that box. The columns are labeled by party name across the top. Some operations show how messages are formed on the right of the equal sign with the message number (shown in square brackets) on the left of the equal sign. The operation of a party saving a value under a symbolic name is denoted in the same way as that of forming a message, except that the symbolic name appears on the left instead of a message number. Another kind of operation is test for equality and inequality; these are indicated by the symbols "?=?" and "?≠?", respectively. The party performing one of these tests within a protocol terminates the protocol when the condition is not satisfied; the protocol is stopped when the two comparands of an ?=? differ or when the comparands of a ?≠? are the same. Where the test is at the end of a protocol, the result of the protocol may be thought of as positive when the test would not have caused the protocol to terminate, and negative otherwise. The final kind of operation is that of sending a message. This is shown by a message number on the left; followed by the recipient party's name and an arrow (these appear for readability as either a recipient name then left pointing arrow, when the recipient is on the left; or right pointing arrow then recipient name, when the recipient is on the right); followed by a colon; finally followed by an expression fully denoting the actual value of the message that should be sent. Note that the values of some variables in such message expressions may not be known by the sender and others may be unknown to their recipient.

Several ways to form expressions are used. One is just the word "random". This is used to mean that a value is preferably chosen substantially uniformly from an appropriate set, defined in the text, and substantially independently of everything else in the protocol. Thus a party should preferably employ a physical random number generator for these purposes, but a variety of other techniques may be applied, as already described for boxes 604, 607, 610, 613, and 615. In practice, however, well known pseudo-random generator or hybrid techniques may be applied. Since the results of these random expression are used as keys which should not be determinable by the other party to the protocol (at least until the creating party may choose to release them), the random generation must be substantially unpredictable to an adversary. The function f is preferably a publicly-agreed one-way function, such functions being well know in the art.

When no operation is shown explicitly, the group operation referred to here as multiplication is assumed. Another kind of expression involves exponents which denote raising to powers in the group. The well known convention is adopted here that operations in the base are group operations and that arithmetic in the exponent is modulo the order of the group. But parties need not actually know the order of the group, in all but one optional case mentioned later, since parties can simply use natural number arithmetic in the exponent. Also, when a random value, as mentioned above, is to be created for use in the exponent, its distribution can be made very close to uniform, even when the order of the group is not known: the exponent is chosen say uniformly from 1 to say the square of an upper bound on the order of the group.

For clarity in exposition and concreteness, however, the preferred embodiments will be presented here in terms of the multiplicative group of order prime p. As has already been mentioned, the scope of the present invention should not be considered to be limited to any particular group, and the present detailed description could readily be translated by someone of ordinary skill in the art to any suitable group.

Figure 1:
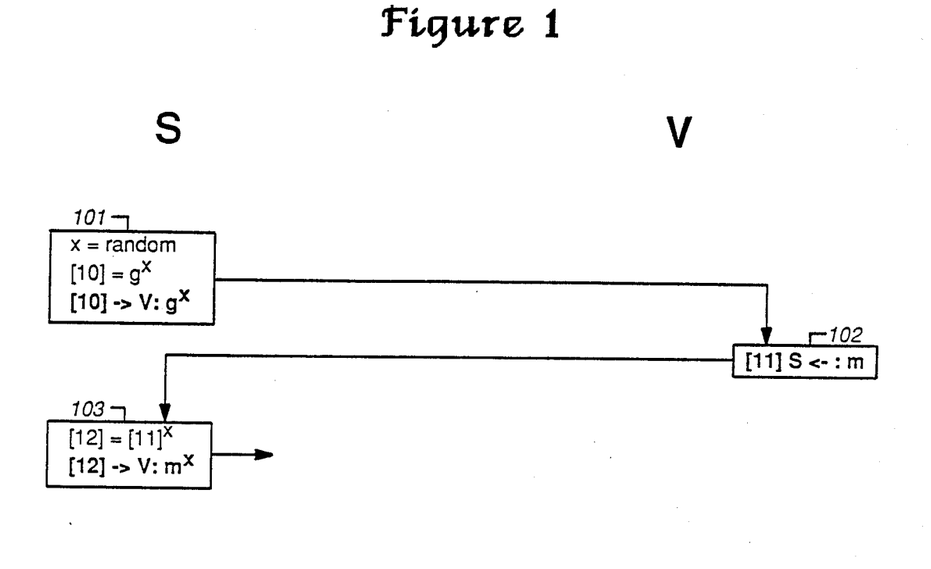
FIG. 1 shows a flowchart of a preferred embodiment of a combination public key creating and undeniable signature forming protocol in accordance with the teachings of the present invention.

Turning now to FIG. 1, the first flowchart for part of the preferred embodiment will now be described in detail. This part shows public key creating and issuing, which need only be carried out once by the signer party S, and also the forming of a single undeniable signature for party V.

Flowchart box 101 shows S choosing x uniformly and at random from the interval 1 to $p-1$, such random selection as already mentioned. Then S raises g to the x'th powder modulo p, such exponentiation already having been described and well known in the art. The resulting residue is then called message [10]. As per the definition of the notation already described, message [10] is then shown as being sent from S to V. This completes the creating and issuing of a public key by S.

Box 102 indicates that, after receiving the public key as message [10], V sends an original message m for signing to S as message [11]. For the purposes of the present invention the nature or source of m is not essential and it may be regarded as any suitable message (or blinded message, as has already been mentioned and will be mentioned in detail later).

Box 103 shows how, after receiving message [11], S first forms a signature from it by raising it to the secret power x. The exponentiation is done in this particular exemplary embodiment, as already mentioned, in the group of order p. Finally, the signature denoted as message [12] is shown being sent by S to V, who would ordinarily receive it and retain it for possible later use in one of the other protocol parts.

It may be pointed out here that if an ordinary digital signature is formed by S on the pair comprising message [11] and message [12], sig(f([11], [12])), and this is later shown to a third party who trusts S, then the third party is able to determine that [12] is a valid undeniable signature of [11].

Turning now to FIG. 2, the second flowchart for part of a preferred embodiment will now be described in detail. This part shows a first exemplary arrangement for the checking of an undeniable signature, the issuing of which has just been shown in detail in FIG. 1.

Box 201 shows how V prepares the initial challenge and sends it to S. First a and b are chosen substantially independently and uniformly at random from 1 to p (or in somme other suitable way when the order of the group is not known to V, as has already been mentioned). Then message [21] is formed as the product (in the group, as already mentioned) of message [12] raised to the power a and message [10] raised to the power b. This message is then sent by V to S, and should have the form shown in the last line of this box. (But since V does not know x, this is an example of the comment made earlier that neither party acting alone need be able to determine the value of all variables of such expressions.)

Box 202 is the formation and return of S's response to the challenge received from V. The multiplicative inverse of x modulo the order of the group is shown in the usual way in the exponent of message [21], to produce message [22]. Thus, message [22] is shown as being obtained by applying the inverse of the signing function to the message [21]. (A protocol not requiring that the order be known is shown in FIG. 3, to be described in detail.) The resulting message [22] should be of the form shown, $m^a g^b$, and is shown as being supplied to V.

Box 203 shows the checking of the response [22] received from S by V. First V uses the values of m, g, a, and b known to V to construct the value that should have been returned by S in case the signature was valid. This is done by raising m to the power a and multiplying the result by g raised to the power b. Then V simply compares the value constructed with that received from S in message [22]. If they are equal, then V stops the protocol, as called for by the definition of the symbol ?≠? given above. In this case, V knows that [12] is with high certainty the signature of m corresponding to public key [10]. In the remaining case, that the inequality holds, V continues the protocol with the knowledge that either (a) [12] is not the proper signature or (b) S is trying to improperly deny the signature. The rest of this flowchart allows V to distinguish between these two subcases.

Box 204 is similar to 201 except that c and d are used instead of a and b. First c and d are created by the random expression already described so that they are suitable secret exponents. Then message [24] is formed as the product of message [12] raised to the c power times message [10] raised to the d power. Finally, message [24] is sent by V to S.

Box 205 is again similar to its predecessor, box 202, and in fact the operations performed by S are the same. The only difference is that the input is message [24] instead of [21] and the output is [25] instead of [22]. One consequence of this is that S need not know which of these two steps in the protocol is being performed.

Box 206 shows the final test made by V based on the messages [22] and [25] received from S. The test shown is made by comparing the equality of two essentially similarly constructed quantities. The first is the product of message [22] and g raised to the $-b$ power, all raised to the c power; the second is message [25] times g to the $-d$ power all to the a power. Notice that the negative exponents on g need not mean that V must compute multiplicative inverses, since the multiplicative inverse of g could have been made public by some other party. As should be obvious to those of skill in the art, however, the comparison can be made in practice without needing multiplicative inverses. There are two cases: if $bc > da$, test $[22]^c? = ?[25]^a g^{bc-da}$ or if $bc \leq da$, test $[22]^c g^{da-bc}? = ?[25]^a$. Regardless of how the test is made, if the equality holds, then S is with high probability behaving honestly and [12] is not a valid signature; if the equality does not hold, then S is believed to be behaving improperly.

Again the possibility of an ordinary digital signature on the transaction by S is considered. It might in this case contain message [21] and message [22] and cold be denoted: sig(f([21], [22])). The third party would be supplied this digital signature, m, [12], a, and b by V, and would check the validity of the undeniable signature by checking that the digital signature is valid, $[21]? = ?[12]^a[10]^b$, and $[22]? = ?m^a g^b$. Such testing may be considered to be shown in FIG. 2, since essentially the same operations are performed by V.

Turning now to FIG. 3, the third flowchart for part of a preferred embodiment will now be described in detail. This part shows a second alternate arrangement for the checking of an undeniable signature, the issuing of which has already been shown in detail in FIG. 1.

Box 301 is similar to box 201 in that a first challenge is created based on two randomly generated exponents, called again here a and b. Thus, V chooses these two exponents substantially independently and uniformly, and keeps them secret. What V sends to S in message [31] is the product of m raised to the a and g raised to the b. Notice that since all of these values are known to V, the explicit construction of the message is omitted from the flowchart and its value is shown in the line for the sending of the message only.

Box 302 entails S raising the received message [31] to the x power and then applying the one-way function f to the result. This image under the one-way function is what is returned to V by S in message [32].

Box 303 merely indicates that after receiving message [32] from S, V forwards m, a, and b individually to S in messages [33.1], [33.2], and [33.3], respectively.

Box 304 first shows how S tests that all the messages received from V during this part of the protocol—[31], [33.1], [33.2], and [33.3]—are mutually consistent. This is accomplished by testing the equality of [31] with the result of reconstructing its value from the others. The reconstruction is accomplished by forming the product of [33.1] raised to the [33.2] with g raised to the [33.3]. If the equality is not satisfied, S stops the protocol, as per the definition of the notation, and knows that V has been supplying improper messages. If the equality is satisfied, S returns to V message [31] raised to the secret power x in the form of message [34].

Box 305 shows two tests by V. The first checks that [34] really is the inverse image of [32] under f. If this test fails, then V stops the protocol knowing that S was supplying improper messages. Otherwise V makes a test similar in intention and form to that of box 203. Message [34] is tested for inequality with the product of message [12] raised to the power a and message [10] raised to the power b. If they are equal, then V stops the protocol and knows that with high probability [12] is indeed the signature of m corresponding to public key [10]. In case the inequality does hold, V continues the protocol but with the knowledge that either (a) [12] is not the proper signature or (b) S has tried to improperly deny the signature. And as with FIG. 2, the remaining part of this flowchart allows V to distinguish between these two subcases.

Box 306 is similar to box 204 in that a second challenge is created based on two randomly generated exponents, called again here c and d, but they are combined into the challenge in the style of 301. That is [36] is formed as the product of m raised to the c times g raised to the d, and it is supplied by V to S.

Box 307 shows S raising the received message [36] to the x power and then applying the one-way function f to the result. This image under the one-way function is what is returned to V by S in message [37].

Box 308 denotes that after receiving message [37] from S, V sends a and b individually to S in message [38.1] and [38.2], respectively.

Box 309 first shows how S tests the mutual consistency of messages [36], [33.1], [38.1], and [38.2] received from V. This is accomplished by testing the equality of [36] and the product of [33.1] raised to the [38.1] times g raised to the [38.2]. If the equality is not satisfied, S stops the protocol knowing that V has been supplying improper messages. If the equality is satisfied, S supplies V with message [36] raised to the power x called message [39].

Box 310 shows two tests by V. The first checks that [39] is the inverse image of [37] under f. If this is not so, then V stops the protocol known that S was supplying improper messages. The second tests messages [34] and [39] received from S. The test shown compares the equality of two values. The first value is the product of message [34] and g raised to the $-b$ power, all raised to the c power; the second is message [39] times g to the $-d$ power all to the a power. Again, as should be obvious to those of skill in the art, the comparison can be made in practice without computing multiplicative inverses. There are two cases: if $bc > da$, test $[34]^c? = ?[39]^a g^{bc-da}$ or if $bc \leq da$, test $[34]^c g^{da-bc}? = ?[39]^a$. No matter how the test is made, if the equality holds, then S is with high probability behaving honestly and [12] is not a valid signature; if the equality does not hold, then S is believed certainly to be performing improperly.

A digital signature issued for this protocol by S need include only messages [31] and [34], and would thus be of the form: sig(f([31], [34])). The third party would additionally be supplied m, [12], a, and b by V, and would check the validity of the undeniable signature by checking that the digital signature is valid, $[31]?=?m^a g^b$, and $[34]?=?[12]^a[10]^b$. Such testing again may be considered to be shown in FIG. 3, since it entails essentially the same operations already shown as performed by V.

Figure 4:
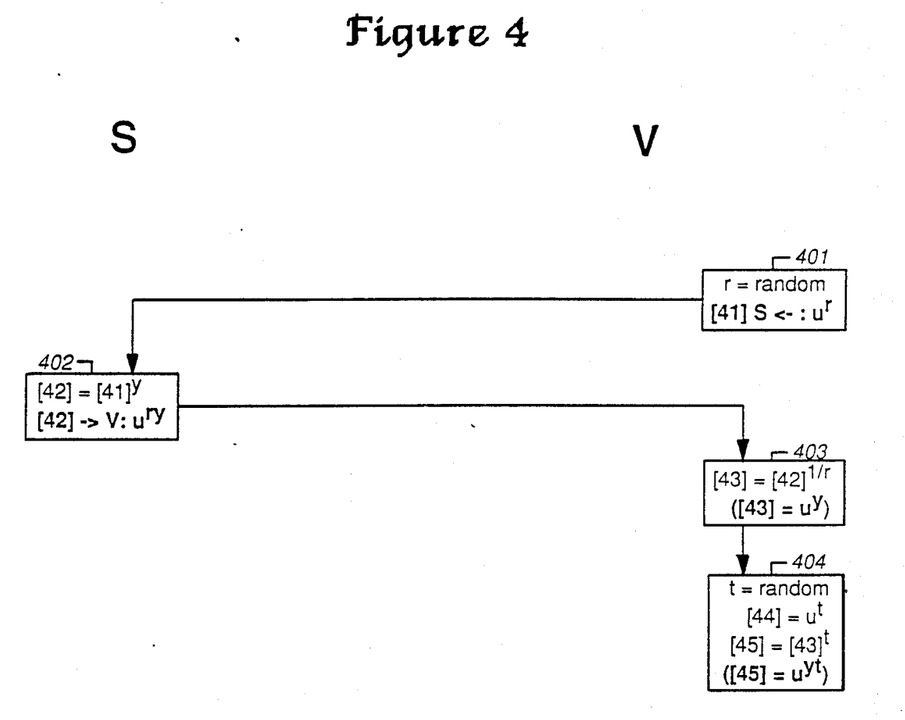
FIG. 4 shows a flowchart of a preferred embodiment of an exponential blinding and a corresponding re-blinding protocol in accordance with the teachings of the present invention.
Figure 5:
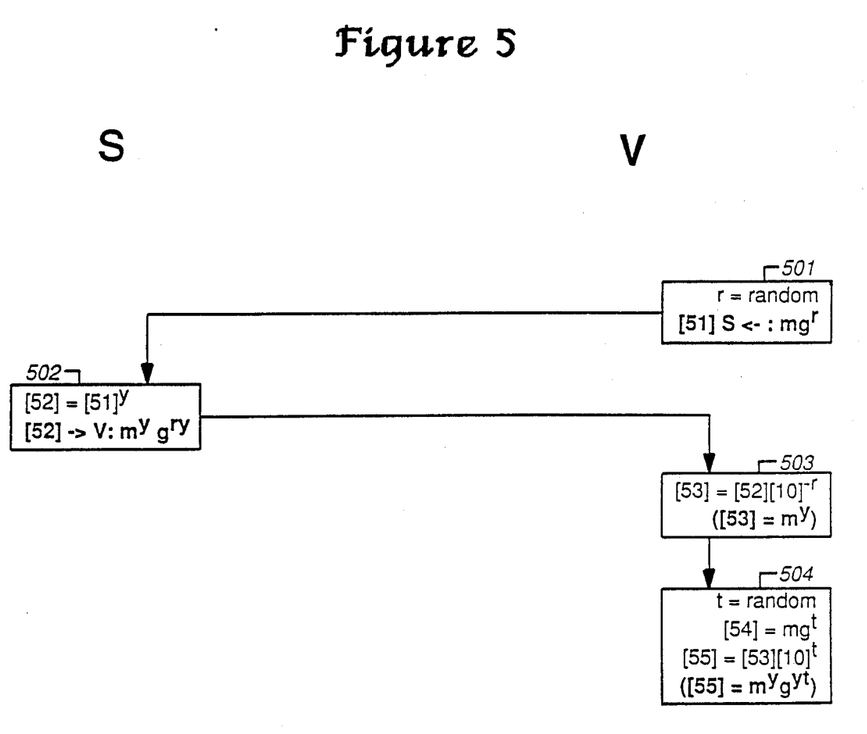
FIG. 5 shows a flowchart of a preferred embodiment of an unanticipated signature blinding and a corresponding re-blinding protocol in accordance with the teachings of the present invention.

Turning now to FIG. 4, the fourth flowchart for part of the preferred embodiment will now be described in detail. This part shows one kind of blinding, called "exponential blinding," of a message by party V, raising the result to a secret power by S, and unblinding of the returned message by V. As will be obvious to those of ordinary skill in the art, and will be described later in detail, these operations are generic: blinding could be performed by V on any message before it is raised to a secret power by S, and the result returned by S could be unblinded. In particular, it could be applied to all three blindings and unblindings shown in FIG. 6, i.e. 606 and 608; 609 alone; or 614 and 616.

Box 401 shows how V blinds message u and sends it to S. First V chooses r independently and uniformly from 1 to p−1. Then V raises u to the power r to form message [41], which V sends to S.

Box 402 shows receipt of message [41] by S and its transformation and subsequent return to V. To make the transformation, S raises message [41] to the secret power y; the result is supplied to V as message [42].

Box 403 shows the unblinding of the blinded message received by V. The multiplicative inverse of r modulo the order of the group is applied as an exponent to the message [42] received from S, and the result is shown as message [43]. For clarity, the last line of box 403 shows parenthetically that the value of message [43] should be u raised to the y power.

Box 404 shows the optional creation of another secret blinding key t, and its use in reblinding the message u. First t is created at random as r was. Then message [44] is formed as u raised to the power t. Message [45] is shown as being created by raising message [43] to the t power. For clarity, the last line of box 404 again shows parenthetically that the value of message [45] should be u raised to the power yt.

Some specific examples will now be presented so that some exemplary embodiments of the generic exponential blinding and unblinding operations just described in detail may be more fully appreciated. In FIG. 1, message [11] could be blinded by V before being sent to S for signing (i.e. $y=1/x$), and the resulting message [12] could be unblinded by V before it is used in FIG. 2, as is shown by blinder 606 and unblinder 608 already described. Message [31] could also be blinded before being sent to S in the testing of FIG. 3 ($y=x$), and the returned message [34] could be unblinded before being tested, as shown by blinder 614 and unblinder 616; the blinding of message [36] and the testing of the returned message [39] would of course be essentially the same. When the same operations are applied for FIG. 2, it will be obvious to those of ordinary skill in the art that the exponent used in boxes 401 and 403 would be exchanged (with $y=1/x$) if they are to serve as 606 and 608, respectively. Notice that messages [44] and [45] could be regarded as the unsigned and signed form, respectively, of a single blinded message, such as might be used as input to challenger 612, for either FIG. 2 or FIG. 3.

As would be obvious to those of ordinary skill in the art, the blinding of various messages can be superimposed, to give for example double blinding as disclosed in the application entitled "blind signature systems," by the present applicant, already mentioned in the description of the prior art. So called "re-blinding" was disclosed for the unanticipated blind signature system already referenced in the description of the prior art. For the present invention, a kind of re-blinding is also possible. The result of re-blinding is a pair comprising a blinded message and a blinded signature of that message. These could then be used in the protocol of FIG. 2 as just described. Some other protocol, such as that disclosed by Chaum and Evertise in "A secure and privacy-protecting protocol for transmitting personal information between organizations", Proceedings of Crypto 86, A. Odlyzko Ed., Springer 1987, might be used to show that these re-blinded messages are related to some other messages in a desired way, and the protocol of FIG. 2 for instance used to show that one member of the pair is in fact a signature on the other member.

Ordinary digital signatures could be used here again to allow a third party to check a transaction that is blinded in the way shown in FIG. 5. In addition to the other data already described in detail for FIGS. 1–3, the exponent r must also be provided to the third party to allow checking. Then the third party performs the checks as already described, except that the expression corresponding to the input to S must be raised to the r power and the multiplicative inverse of r modulo p must be applied to the expression for the output of S, as would be obvious to those of skill in the art.

Turning now to FIG. 5, the fifth flowchart for part of the preferred embodiment will now be described in detail. This part shows another kind of blinding, related to the "blinding for unanticipated signatures" already referenced in the background of the invention, in which a message is blinded by V, the result is raised by S to a secret power y, and the returned message is unblinded by V.

Box 501 shows how V blinds message m and sends it to S. First V chooses r independently and uniformly from 1 to p−1. Then V raises g to the power r and multiplies the result with m to form message [51], which V sends to S.

Box 502 shows receipt of message [51] by S and its signing and subsequent return to V. To make the signature, S raises message [51] to the secret power y; the result is supplied to V as message [52].

Box 503 shows the unblinding of the signed blinded message received by V. The multiplicative inverse of message [10] raised to the r is first formed. Then this is multiplied with message [52] received from S, and the result is shown as message [53]. Again for clarity, the last line of box 503 shows parenthetically that message [53] should have the value m raised to the y power.

Box 504 shows the optional creation of another secret blinding key t, and its use in re-blinding the message m. First t is created at random as r was. Then message [54] is formed as m times g to the power t. Message [55] is shown as being created by raising message [10] to the t power and multiplying the result by message [53]. For clarity, the last line of box 504 again shows parenthetically that the value of message [55] should be m raised to the power t times g raised to the power yt. It should be pointed out that the forming of message [55] has been shown for clarity only in the case when x=y, but, as would be obvious to those of skill in the art, in the case when y=1/x message [55] would not be formed from message [10], but would rather be formed from the analog of message [10] that contains the value $g^{1/x}$. Notice that messages [54] and [55] could again be regarded as the unsigned and signed form, respectively, of a single blinded message.

As an example use of such unanticipated signature techniques adapted to this setting, the signing operation of FIG. 1 might be performed so as to yield V an undeniable signature unlinkable by S. That is, if a plurality of such signatures are obtained with independent r's, then S should be unable to determine anything about which signature corresponds with which instance of the signing process. The pair comprising a blinded message and a blinded signature of that message used in re-blinding has already been shown in box 504, and the comments already made for box 404 could apply to this box as well.

Some specific examples will now be presented so that some exemplary embodiments of the generic unanticipated signature blinding and unblinding operations just described in detail may be more fully appreciated. In FIG. 1, message [11] could be blinded by V before being sent to S for signing (i.e. y=x), and the resulting message [12] could be unblinded by V before it is used in FIG. 2, as is shown by blinder 606 and unblinder 608 already described. Message [31] could also be blinded before being sent to S in the testing of FIG. 3 (y=x), and the returned message [34] could be unblinded before being tested, as shown by blinder 614 and unblinder 616; the blinding of message [36] and the testing of the returned message [39] would of course be essentially the same. When the same operations are applied for FIG. 2, it will be obvious to those of skill in the art that the exponent used in boxes 501 and 503 would be exchanged (with y=1/x) if they are to serve as 606 and 608, respectively. Notice that messages [54] and [55] could be regarded as the unsigned and signed form, respectively, of a single blinded message, such as might be used as input to challenger 612, for either FIG. 2 or FIG. 3.

Ordinary digital sigantures could again be used to allow a third party to check a transaction that is blinded in the way shown in FIG. 5. In addition to the other data already described in detail for FIGS. 1-3, the exponent r must also be provided to the third party to allow checking. Then the third party performs the checks as already described, except that the blinding factor $g^r$ must be included in the expression corresponding to the input to S and $[10]^{-r}$ must be included in the expression for the output of S.

As again would be obvious to those of ordinary skill in the art, the blinding of various messages can be superimposed to give double blinding as already mentioned and re-blinding is also possible as already described during the detailed description for FIG. 4.

Another variation that would be obvious to those of ordinary skill in the art would involve plural original message parts in a signature. The signature would consist of the product of each such message part raised to a different power. The challenge would contain a separate message corresponding to each part of a signature. The response would be the product of all such messages of a challenge, each having the exponent corresponding to the corresponding message part.

A further and not necessarily mutually exclusive use anticipated would be to include more than two terms in a challenge message. With such an arrangement the mutual consistency of more than two message/signature pairs could be tested while keeping some of the message and processing costs the same. Different random exponents could be used on each term, but if there were sufficiently many terms, it is anticipated that various possibly randomly chosen combinations of possibly smaller exponents might be used.

While these descriptions of the present invention have been given as examples, it will be appreciated by those of ordinary skill in the art that various modifications, alternate configurations and equivalents may be employed without departing from the spirit and scope of the present invention.

What is claimed is:

1. A cryptographic method for forming and checking undeniable signatures where the signatures are called "undeniable" because they can be verified in a protocol between a signing party and a checking party and the signing party is unable to conduct the protocol improperly so as to "deny" the validity of a valid undeniable signature previously issued by the signing party without such improper denial giving at least a probability with at least a known lower bound that the checking party will learn that the signing party has conducted the protocol improperly, the method comprising the steps of:
    forming an undeniable signature from an unsigned message by said signing party using a private key corresponding to a public key, and the resulting undeniable signature being issued to at least one party other than the signing party;
    forming at least one challenge by a checking party using a challenge key known to said checking party, the challenge key being unknown to said signing party at least until a response by said signing party is committed to by the signing party, and the challenge at least partially depending on at least one member of a pair having a purported undeniable signature and said unsigned message, and supplying the at least one challenge to said signing party;
    transforming at least one said challenge received by said signing party using knowledge of said private key and returning to said checking party the result of the transformation as said response; and
    checking at least one said response received by said checking party using values at least depending on said challenge key, to give at least a probability having a known lower bound that the signing party is unable to prevent the checking party from distinguishing between three cases:
    (a) that said purported undeniable signature is a valid undeniable signature corresponding both to said public key and to said unsigned message, (b) that the purported undeniable signature is not a valid undeniable signature corresponding both to the public key and to the unsigned message, and
    (c) that the response by the signing party is an improper response.

2. The method according to claim 1, wherein said signing party is unable with said probability having a known lower bound to prevent the checking party from distinguishing between said three cases because of the inability of the signing party to perform certain computations in a predetermined available time period.

3. The method according to claim 1, wherein said signing party is unable with said probability having a known lower bound to prevent said checking party from distinguishing between said three cases regardless of the computational resources available to the signing party.

4. The method according to claim 1, wherein said signing party develops said public key and corresponding private key from a substantially randomly chosen seed and the signing party issues the public key making it receivable to said checking party.

5. The method according to claim 1, wherein said signing party receives substantially said unsigned message from a providing party and the signing party returns said undeniable signature to the providing party.

6. The method according to claim 5, wherein said providing party supplies said undeniable signature to said checking party and the checking party is distinct from the providing party.

7. The method according to claim 3, wherein said signing step comprises raising said unsigned message to a signing power derived from said private key, such exponentiation being performed in a finite structure where the inverse of such exponents is unknown.

8. The method according to claim 1 further including the step of:
creating a public key and a corresponding private key, and distributing them so that the private key is known to said signing party and the public key but not the private key is known to a checking party.

9. The method as in claim 1, further comprising the steps of:
blinding said unsigned message responsive to a blinding key before providing the resulting blinded unsigned message to said signing party in place of said unsigned message; and
unblinding said undeniably signed message returned by said signing party responsive to said blinding key.

10. The method as in claim 1, further comprising the steps of:
blinding, responsive to a blinding key, said undeniably signed message and also said corresponding unsigned message; and
using said blinded undeniably signed and said blinded unsigned messages in place of said undeniably signed and said unsigned message, respectively, by said checking party in 11. The method as in claim 1, further comprising the steps of:
blinding, responsive to a blinding key, at least part of one of said challenge and said response; and
unblinding, responsive to said blinding key, at least part of the other one of said challenge and said response.

12. The method according to claim 9, 10 or 11 wherein:
said signing step includes raising said unsigned message to a secret signing power derived from said private key, such exponentiation being performed in a finite structure where it is defined;
said blinding step includes the operation of raising the message to be blinded to a power derived from said blinding key; and
said unblinding step includes raising the message to be unblinded to a power that acts as an inverse operation to that of said blinding operation.

13. The method according to claims 9, 10 or 11 wherein:
said signing step includes raising said unsigned message to a secret signing power derived from said private key, such exponentiation being performed in a finite structure where it is defined;
said blinding step includes forming a product of at least a first message which is raised to a blinding power derived from said blinding key times at least a second message to be blinded; and
said unblinding step includes forming a product of the multiplicative inverse of the undeniably signed form of said first message raised to the blinding power times said second message.

14. Cryptographic apparatus for forming and checking undeniable signatures where the signatures are called "undeniable" because they can be verified in a protocol between a signing party and a checking party and the signing party is unable to conduct the protocol improperly so as to "deny" the validity of a valid undeniable signature previously issued by the signing party without such improper denial giving at least a probability with at least a known lower bound that the checking party will learn that the signing party has conducted the protocol improperly, said apparatus comprising:
means for forming an undeniable signature from an unsigned message by said signing party using a private key corresponding to a public key, and the resulting undeniable signature being issued to at least on party other than the signing party;
means for forming at least one challenge by a checking party using a challenge key known to said checking party, the challenge key being unknown to said signing party at least until a response by said signing party is committed to by the signing party, and the challenge at least partially depending on at least one member of a pair having a purported undeniable signature and said unsigned message, and supplying the at least one challenge to said signing party;
means for transforming at least one said challenge received by said signing party using knowledge of said private key and returning to said checking party the result of the transformation as said response; and
means for checking at least one said response received by said checking party using values at least depending on said challenge key, to give at least a probability having a known lower bound that the signing party is unable to prevent the checking party from distinguishing between three cases:
(a) that said purported undeniable signature is a valid undeniable signature corresponding both to said public key and to said unsigned message, (b) that the purported undeniable signature is not a valid undeniable signature corresponding both to the public key and to the unsigned message, and (c) that the response by the signing party is an improper response.

15. Apparatus according to claim 14, wherein said lower bound on said probability is known to be at least one half.

16. Apparatus according to claim 14, wherein said lower bound on said probability is known to be at least one minus a value that is super linear in the size of the challenge message.

17. Apparatus according to claim 14, wherein said known lower bound on said probability is at least one minus the number of substantially distinct possible challenges.

18. Apparatus according to claim 14, wherein said means for forming include means for raising said unsigned message to a secret signing power derived from said private key, such exponentiation being performed in a finite structure where it is defined.

19. Apparatus according to claim 18, wherein:
at least part of said challenge is formed responsive to at least two undeniable signatures by raising the signatures to powers derived from said challenge key;
at least part of said response is formed by raising at least part of said challenge to a power that acts substantially as the inverse of said secret signing power; and
said checking is performed at least in part by raising the at least two unsigned messages corresponding to said at least two undeniable signatures to powers derived from said challenge key.

20. Apparatus according to claim 19, wherein at least one of said two unsigned messages is a fixed constant and at least one of said two undeniable signatures is at least a part of said public key.

21. Apparatus according to claim 14, wherein the means for forming, means for transforming, and means for checking perform computations over a group of prime order.

22. Apparatus according to claim 14, wherein said means for forming includes means for raising said unsigned message to a signing power derived from said private key, such exponentiation being performed in a finite structure where the inverse of such exponents is unknown.

23. Apparatus according to claims 14 or 22, wherein:
at least part of said challenge is formed responsive to at least two unsigned messages by raising the two unsigned messages to powers derived from said challenge key;
at least part of said response is formed by raising at least part of said challenge to a signing power; and
said checking is performed at least in part by raising at least part of said response to powers derived from said challenge key.

24. Apparatus according to claim 23, wherein at least one of said two unsigned messages is a public constant and at least one of said two undeniable signature is at least a part of said public key.

25. Apparatus according to claim 14, further including:
means for blinding said unsigned message responsive to a blinding key before providing the resulting blinded unsigned message to said signing party in place of said unsigned message; and
means for unblinding said undeniably signed message returned by said signing party responsive to said blinding key.

26. Apparatus according to claim 14, further including:
means for blinding, responsive to a blinding key, said undeniably signed message and also said corresponding unsigned message; and
means for using said blinded undeniably signed and said blinded unsigned messages in place of said undeniably signed and said unsigned message, respectively, by said checking party in forming said challenge and in checking said response.

27. Apparatus according to claim 14, further including:
means for blinding, responsive to a blinding key, at least part of one of said challenge and said response; and
means for unblinding, responsive to said blinding key, at least part of the other one of said challenge and said response.

28. Apparatus according to claim 25 wherein:
said means for forming includes means for raising said unsigned message to a secret signing power derived from said private key, such exponentiation being performed in a finite structure where it is defined;
said blinding means includes means for raising the message to be blinded to a power derived from said blinding key; and
said unblinding means includes means for raising the message to be unblinded to a power that acts as an inverse operation to that of said blinding operation.

29. Apparatus according to claim 25 wherein:
said means for forming includes means for raising said unsigned message to a secret signing power derived from said private key, such exponentiation being performed in a finite structure where it is defined;
said blinding means includes means for forming a product of at least a first message which is raised to a blinding power derived from said blinding key times at least a second message to be blinded; and
said unblinding means includes means for forming a product of the multiplicative inverse of the undeniably signed form of said first message raised to the blinding power times said second message.

30. Apparatus according to claim 14 further including:
means for issuing a public key digital signature by said signing party responsive to at least one said challenge and one said response; and
means for checking said public key digital signature.

31. A cryptographic method for forming and checking undeniable signatures where the signatures are called "undeniable" because they can be verified in a protocol between a signing party and a checking party and the signing party is unable to conduct the protocol improperly so as to "deny" the validity of a valid undeniable signature previously issued by the signing party without such improper denial giving at least a probability with at least a known lower bound that the checking party will detect that the signing party has conducted the protocol improperly, the method comprising the steps of:
forming at least one challenge by a checking party using a challenge key known to said checking party, the challenge key at least partially unknown to said signing party at least until a response by said signing party is substantially committed to by the signing party, and the challenge at least partially depending on at least one member of the triple consisting of a public key, an undeniable signature and an unsigned message, and supplying the at least one challenge to said signing party;
transforming at least one said challenge received by said signing party using knowledge of a private key corresponding to said public key and returning to said checking party the result of the transformation as at least one said response; and checking said at least one response received by said checking party using predetermined values used by the checking party in forming said challenge, whereby the checking party can distinguish with a probability having a lower bound known at least to the checking party between at least two cases: (a) the signature is invalid, and (b) the response from the signer is improperly formed.

32. A method according to claim 31 further including the step of:

forming an undeniable signature from an unsigned message by said signing party using said private key corresponding to said public key, and the resulting undeniable signature being issued to at least one party other than the signing party.

33. The method according to claim 31, wherein said signing party is unable with said probability having a known lower bound to prevent the checking party from distinguishing between said two cases because of the inability of the signing party to perform certain computations in a predetermined available time period.

34. The method according to claim 31, wherein said signing party is unable with said probability having a known lower bound to prevent said checking party from distinguishing between said two cases regardless of the computational resources available to the signing party.

35. The method according to claim 32, wherein said signing party develops said public key and corresponding private key from a substantially randomly chosen seed and the signing party issues the public key making it receivable to at least said checking party.

36. The method according to claim 34, wherein said known lower bound on said probability is at least one minus the number of substantially distinct possible challenges.

37. The method according to claims 1, 2, 3, 4, 5, 6, 31, 32, 33, 34, or 35, wherein said lower bound on said probability is known to be at least one half.

38. The method according to claim 37, wherein said lower bound on said probability is known to be at least one minus a value that is more than linear in the size of the challenge message.

39. The method according to claims 1, 2, 3, 4, 5, 6, 36, 31, 32, 33, 34, or 35, wherein said signing step comprises raising said unsigned message to a secret signing power derived from said private key, such exponentiation being performed in a finite structure where it is defined.

40. The method according to claim 39, wherein said raising to said secret signing power is performed in a finite group.

41. The method according to claim 40, wherein:

at least part of said challenge is formed responsive to at least two undeniable signatures by raising the signatures to powers derived from said challenge key;

at least part of said response is formed by raising at least part of said challenge to a power that acts substantially as the inverse of said secret signing power; and said checking is performed at least in part by raising the at least two unsigned messages corresponding to said at least two undeniable signatures to powers derived from said challenge key.

42. The method according to claim 41, wherein at least one of said two unsigned messages is a fixed constant and at least one of said two undeniable signatures is at least a part of said public key.

43. The method according to claims 1, 2, 3, 4, 5, 6, 36, 31, 32, 33, 34, or 35, wherein the forming, transforming and checking steps comprise computations over a group of prime order.

44. The method according to claim 31, wherein said response is committed to by said signing party issuing to said checking party the image of said challenge under a substantially one-way function.

45. The method according to claim 44, wherein said substantially one-way function is substantially injective.

46. The method according to claims 1, 2, 3, 4, 5, 6, 36, 44, 45, 7, 31, 32, 33, 34, or 35, wherein:

at least part of said challenge is formed responsive to at least two unsigned messages by raising the two unsigned messages to powers derived from said challenge key;

at least part of said response is formed by raising at least part of said challenge to a signing power; and said checking is performed at least in part by raising at least part of said response to powers derived from said challenge key.

47. The method according to claim 46, wherein at least one of said two unsigned messages is a public constant and at least one of said two undeniable signatures is at least a part of said public key.

48. The method according to claim 1 or 31 including the steps of:

issuing a public key digital signature by said signing party responsive to at least one said challenge and one said response; and checking said public key digital signature.

* * * * *